(12) United States Patent
Denome

(10) Patent No.: US 6,598,242 B1
(45) Date of Patent: Jul. 29, 2003

(54) LOW PROFILE TRANSPORTABLE SEWAGE HOLDING TANK

(76) Inventor: Robert P. Denome, 6141 Hicks Rd., Naples, NY (US) 14512

( * ) Notice: Subject to any disclaimer, the term of this patent is extended or adjusted under 35 U.S.C. 154(b) by 0 days.

(21) Appl. No.: 10/153,009

(22) Filed: May 21, 2002

(51) Int. Cl.$^7$ .......................... A47K 11/00; B60R 15/04
(52) U.S. Cl. .......................... 4/321; 220/562; 220/651; 220/661; 220/663; 137/899
(58) Field of Search .............. 4/321–323, 458, 4/114.1; 220/562–564, 651, 653, 661, 663; 137/899

(56) References Cited

U.S. PATENT DOCUMENTS

| | | | | |
|---|---|---|---|---|
| 3,040,333 A | * | 6/1962 | Merrill | |
| 3,570,016 A | * | 3/1971 | Ellis et al. | |
| 3,666,103 A | * | 5/1972 | Green | |
| 4,337,152 A | * | 6/1982 | Lynch | |
| 4,653,125 A | * | 3/1987 | Porter | 4/321 |
| 5,038,418 A | * | 8/1991 | Frey | 4/321 |
| 5,946,742 A | * | 9/1999 | Parker | 4/458 |
| 6,129,117 A | * | 10/2000 | Eriksson | 4/321 |
| 6,430,757 B1 | * | 8/2002 | Pohler | 4/321 |

* cited by examiner

Primary Examiner—Charles R. Eloshway
(74) Attorney, Agent, or Firm—Brian B. Shaw, Esq.; Kimon Papadopoulos; Harter, Secrest & Emery LLP

(57) ABSTRACT

A low profile transportable holding tank for accepting waste from portable toilets. The holding tank is carried on a flatbed vehicle and has a flat deck for cargo, thus effectively increasing the cargo-carrying capacity of the vehicle compared with that available if the vehicle were carrying a conventional holding tank. Internal reinforcement enables the holding tank to withstand a partial vacuum imposed for pumping waste into the tank.

26 Claims, 5 Drawing Sheets

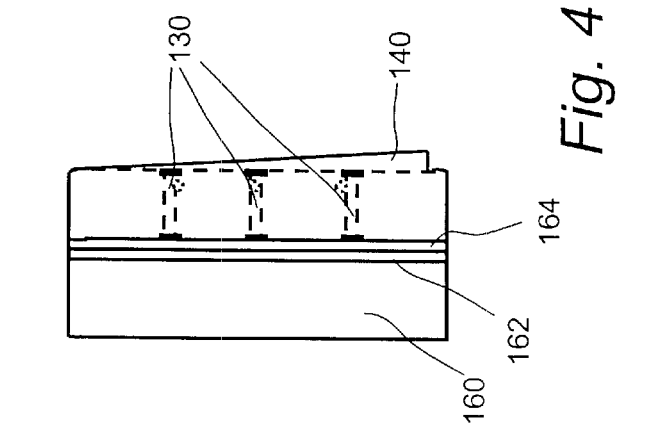
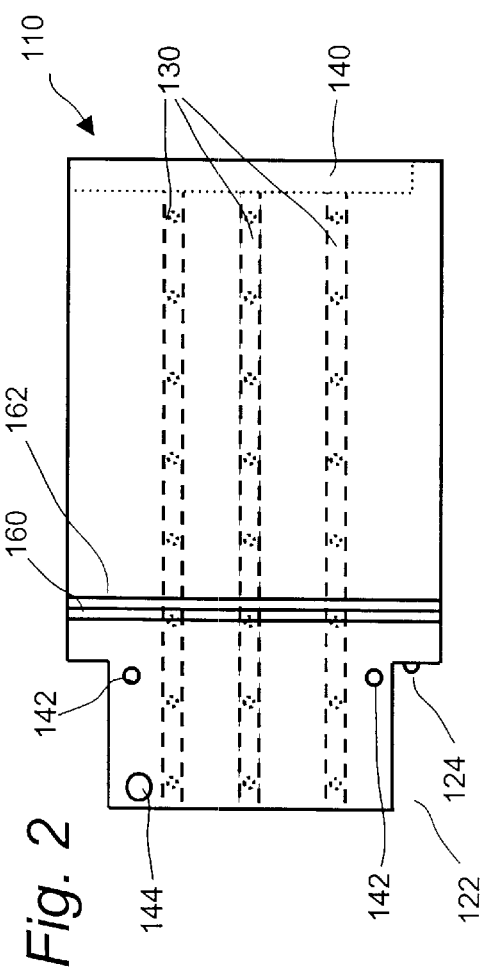
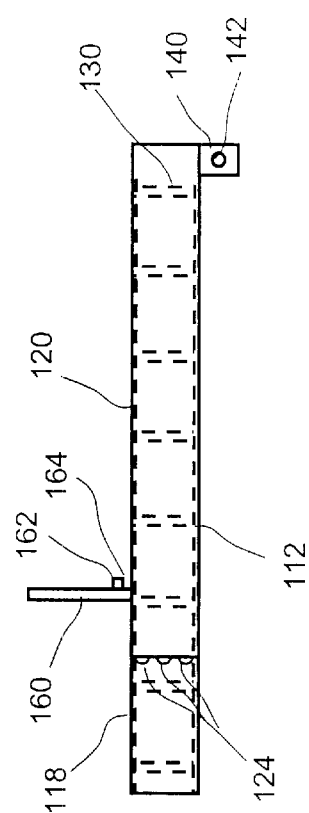
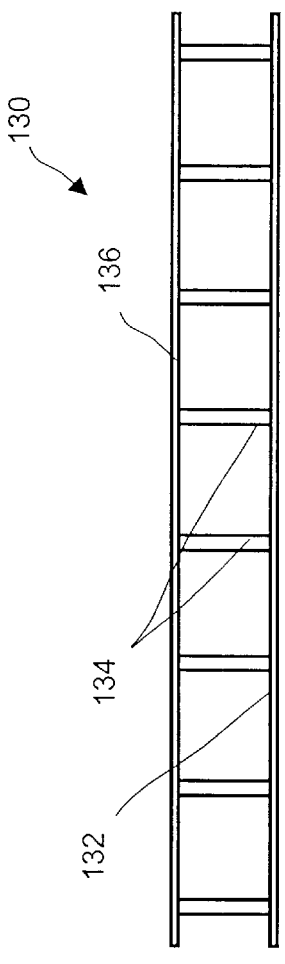

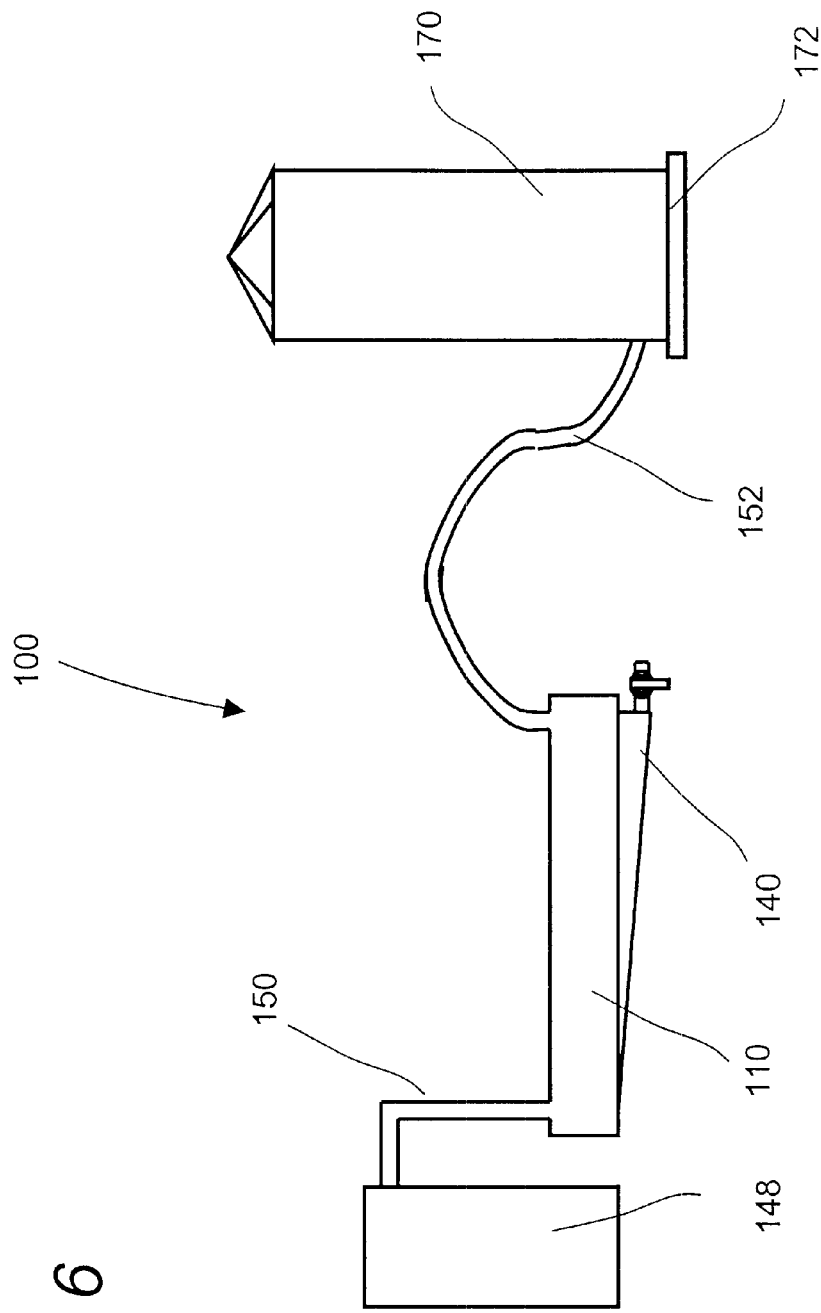

LOW PROFILE TRANSPORTABLE SEWAGE HOLDING TANK

FIELD OF THE DISCLOSURE

This disclosure pertains to a transportable sewage container, and in particular to a sewage container intended for servicing portable toilets.

BACKGROUND

Portable toilets are a feature of construction sites and certain other temporary workplaces, and also of transient public events such as festivals and some sporting occasions. To service these toilets, it is necessary not only to transport them to and from sites where they are used; it is also necessary to transfer accumulated waste into a holding tank, which is transported to a treatment plant for proper disposal. Usually, the same vehicle (usually a flatbed truck) is used to transport both the toilets and the holding tank. Waste is transferred from the toilets to the holding tank by means of a pump that evacuates the holding tank to a vacuum of at least about 12" of mercury. If the portable toilets are at a particular site for an extended time, they may need periodic servicing. Otherwise, they would be serviced at a central location, which may or may not be the location of the treatment plant. In any event, it is often convenient to be able to transport both the waste and the toilets themselves simultaneously on the same vehicle.

The ideal shape for a vessel needing to withstand a high pressure differential is a perfect sphere. A convenient way of describing a general configuration of a three-dimensional vessel is its aspect ratio, which may be defined as the ratio of the size of an object measured in two orthogonal dimensions. Clearly, a spherical vessel has an aspect ratio of 1, since it measures the same distance across in all dimensions. A cubic vessel also has an aspect ratio of 1. While not as strong as a sphere, it is stronger than a comparably shaped vessel with an aspect ratio greater than 1. As a rule of thumb, it may be stated that for any two vessels with comparable shapes and volumes but different aspect ratios, the one having a higher aspect ratio will be weaker with respect to pressure differential, all other factors being equal. A given object may have different aspect ratios depending on the directions of measurement.

It has hitherto been a feature of the aforementioned sewage holding tanks that they are generally cylindrical in shape to provide maximum strength, and do not have an aspect ratio greatly exceeding 1. They can be considered the best practical approximation to a sphere. A customary holding tank occupies a significant area of the truck bed, which obviously limits how many portable toilets can be accommodated. It is possible to envisage a low-profile holding tank occupying substantially the entire area of the truck bed, the tank itself having a flat cargo-bearing surface similar in area to that of the truck bed.

Conventional holding tanks typically have a low aspect ratio, and occupy a smaller area than the envisaged low profile tanks, but are not configured to support additional cargo.

Sometimes dedicated tanker trucks are used for carrying waste, having no additional cargo area for portable toilets. The evacuable, waste-containing portions of these tanker trucks are generally cylindrical. While their dimensions vary, the greatest aspect ratio (in this case evacuable cylinder length divided by diameter) is typically less than 3.

Typically, a flatbed truck carrying a conventional holding tank might have additional space for two portable toilets, while the envisaged low profile holding tank would provide space for at least four. In many situations this would be a distinct economic advantage, since it could cut to a half or a third the number of necessary trips, representing a considerable saving in time and labor.

There is therefore a need for a low profile holding tank configured to provide increased cargo carrying space. Such a configuration must necessarily have an aspect ratio significantly greater than 1, and it would normally be expected to be too weak to withstand the required evacuation. Therefore, there is further a need for a low profile holding tank capable of withstanding such evacuation.

SUMMARY OF THE INVENTION

The holding tank of the invention has a length and width conforming generally to the area of cargo space of a vehicle such as a flat bed or similar truck, and a height much less than the length or width. Consequently, the holding tank has an aspect ratio which may be as high as 24. The holding tank has a floor, walls, and a flat top or deck and is made from mild steel sheet stock.

An internal reinforcement is provided which allows relatively light sheet stock to be used for fabricating the holding tank. The reinforcement includes reinforcement strips inside the floor, support pillars attached to the reinforcement strips, and support strip attached atop the support pillars for absorbing pressure from the deck when the holding tank is evacuated.

Since the flat deck approximates the area of the truck bed, the low-profile holding tank essentially provides the same space for carrying cargo; the holding tank itself therefore uses up no cargo space, and additional space is therefore available for other payload. In particular, the freed up space can be used for transporting more portable toilets per trip than would otherwise be possible.

BRIEF DESCRIPTION OF THE DRAWINGS

FIG. 2 is a top plan view of the holding tank of FIG. 1.

FIG. 3 is a side elevation of the holding tank of FIG. 1.

FIG. 4 is an end elevation of the holding tank of FIG. 1.

FIG. 5 is a side elevation of a support assembly of the holding tank.

FIG. 6 is a schematic of the transportable sewage system connected to a portable toilet.

DETAILED DESCRIPTION OF THE INVENTION

Figure 1:
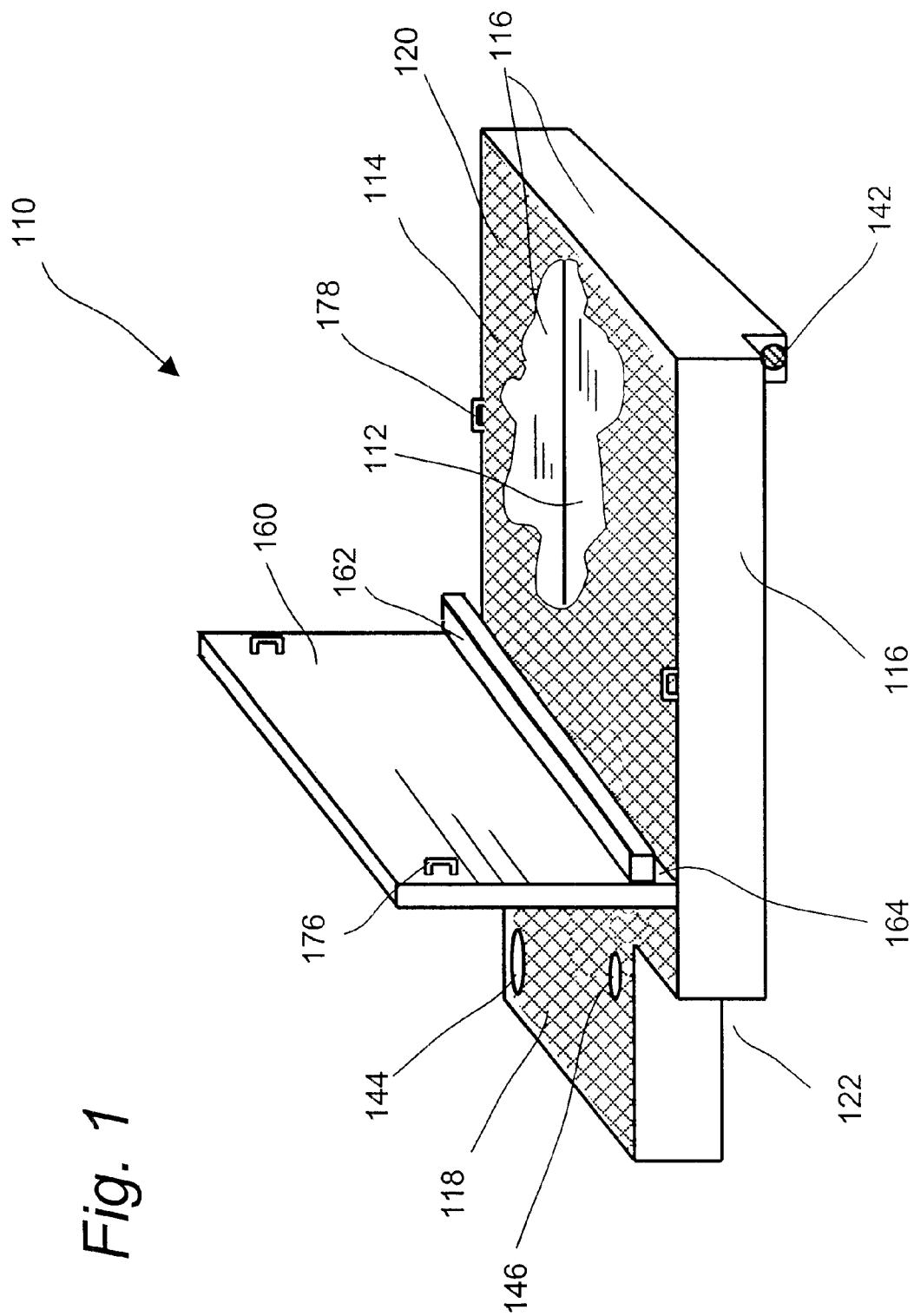
FIG. 1 is a partially cut-away perspective view of a low profile holding tank for a transportable sewage system.

Referring to the drawings, a low profile transportable sewage system 100 is used for receiving waste from portable toilets 170. The system 100 has a holding tank 110, shown in FIGS. 1–4, sized to conform generally with a cargo area of a vehicle 180 such as a truck with a flat truckbed 182. The holding tank 110 can be partially evacuated to receive the waste for transportation to a treatment plant, and has a surface capable of accommodating the transport portable toilets 170 for transportation when necessary.

The holding tank 110 has a floor 112, a deck 114 and walls 116 attached to the floor 112 and the deck 114. Both the floor 112 and the deck 114 are generally flat. As will be described later, it is intended to draw waste into the holding tank 110 by establishing a partial vacuum therein.

The holding tank 110 is typically formed from steel sheet stock, preferably 0.25" thick mild steel. It is fabricated by any suitable combination of cutting and shaping or welding the sheet stock. For example, the floor 112 and at least some of the walls 116 may originate from a single blank of sheet stock. Alternatively, the walls 116 could originate from a single strip of stock that is shaped to conform with the intended perimeter of the holding tank 110; it would then be welded to the floor 112 and the deck 114 finally welded atop the walls 116. In any event, any line along which a wall 116 meets the floor 112, the deck 114 or a neighboring wall 116 must be made fluid-tight by welding where appropriate.

Inside the holding tank 110 are spaced apart longitudinal support assemblies 130 configured as shown in FIG. 5. Each support assembly 130 has a reinforcing strip 132 welded to the floor 112, a series of support pillars 134 welded to the reinforcing strip 132, and a support strip 136 atop the support pillars 134 and welded thereto. The support assemblies 130 are provided to preclude failure that would otherwise occur under a desired pressure differential of 12" of mercury. The low profile system 100 of the invention necessitates that the holding tank 110 should have a high aspect ratio. As explained earlier, such a vessel is less able to withstand evacuation than one that more closely approximates a sphere. Without internal support, the floor 112, deck 114 and wall 116 of the holding tank 110 would have to be prohibitively massive.

In the fabrication of the holding tank 110, the support assemblies 130 obviously have to be put in place before the deck 114 is welded to the walls 116.

A transverse drainage channel 140 is provided at one end of the floor 112. The drainage channel 140 slopes down towards an effluent discharge port 142 below the level of the floor 112. The discharge port 142 is typically equipped with a gate valve.

The holding tank 110 is configured so that there is generally a small clearance between the deck 114 and each of the support assemblies 130, although contact between the deck 114 and the support assembly 130 is not precluded. As the holding tank 110 is evacuated, external air pressure tends to deform the deck 114 inward so that it increasingly contacts the support assemblies 130. In this regard, the flexibility of mild steel renders it particularly suitable for the holding tank 110, although some stainless steels may be used. Other materials such as hard steel are less suitable. Given the small clearance between the deck 114 and the support assemblies 130, the degree of deformation is also small and the deck 114 remains essentially flat, thus enabling the holding tank 110 to carry cargo in a stable manner.

Preferably, the deck 114 is made of diamond plate steel to facilitate any intentional movement of objects thereon. A transverse headboard 160 is mounted atop the deck 114 by a suitable fastening means. The headboard 160 could made of lumber and be securely bolted to an L-shaped attachment member (not shown) welded to the deck 114. A transverse retaining member 162 is attached to the headboard as best seen in FIG. 1. The retaining member 162 is typically a length of standard "four-by-four" lumber, which actually has a 3.75" square cross-section. The retaining member 162 is located on the headboard 160 so that a gap 164 of about 4" remains between the retaining member 162 and the deck 114. In an alternative construction, the headboard 160 is a steel frame and the retaining member 162 is a length of angle iron attached thereto so as to project rearward and provide the required 4" gap.

The headboard 160 defines a line dividing the deck 114 into a front deck 118 and a rear deck 120, the rear deck 120 corresponding to the end of the holding tank 110 with the drainage channel 140, and having an area at least twice that of the front deck 118. The retaining member 162 faces rearward. The headboard 160 is used to secure one or more portable toilets 170 carried atop the rear deck 120 for transportation to or from a use site. Projecting beyond the bottom of many portable toilets 170 is a skid base 172 made up of "four by fours". When a portable toilet 170 abuts the headboard, the skid base 172 is received into the gap 164. The headboard 160 has fastening means such as a strap 174 that passes through anchors 176; the strap is passed around the portable toilet 170 and secured with a buckle. The strap 174 may for example be a ratchet strap and is selected so that it is long enough to pass around multiple portable toilets 170, typically up to four. The interlocking of the skid base 172 with the retaining member 162 provides stability when the vehicle 180 is in motion; wind pressure tends to tilt the portable toilet 170 rearward, upwardly urging the skid base 172 towards the retaining member 162, which limits further tilting. Portable toilets lacking the projecting skid-base 172 as described have an equivalent interlocking feature, for example a recess that can receive the retaining member 162.

Clearly, the retaining member 162 must be securely attached to the headboard 160 to withstand the effects of wind pressure. With the wooden headboard 160 and retaining member 162, the attachment means is for example heavy bolts. With the metal frame construction, the headboard 160 and retaining member 162 may be welded or bolted together.

In addition to the discharge port 142, the holding tank 110 has an evacuation port 144 with a connection 150 to a standard pumping system 148 that includes a vacuum pump, typically driven by an electric-start internal combustion engine, although other types of drive may be used. The pumping system 148 is carried atop the front deck 118 along with other equipment such as an aluminum 250 gallon water tank, a wash down pump, and a water hose and hose reel. Although the holding tank 110 is removable from the vehicle 180, it generally remains on the truckbed 182 for an extended time, and the connection 150 may therefore be hard-plumbed.

The holding tank 110 has at least one inlet port 146 for admitting waste from the portable toilet 170. In fact, there are usually two inlet ports 146, one on either side of the deck 114, either of which can be used as convenient. The inlet ports 146 have valves (not shown) for admitting air to equalize internal and external pressures when pumping is complete. Typically, a 2" diameter flexible vacuum hose 152 is used to connect the inlet port 146 and the portable toilet 170, using aluminum cam lock quick disconnect fixtures. The holding tank 110 has an indent 122 on each side of the front deck 118 to provide space for stowing the vacuum hose 152 and drainage hoses when not in use. FIG. 6 is a schematic of the low profile transportable sewage system 100 as coupled to the portable toilet 170.

At least one waste-level indicator is provided on the holding tank 110. Typically, 2" diameter "fish-eye" sight-glasses 124 are located in a forward-facing wall of the driver's-side indent 122. These are hemispheres of 0.25"-thick polycarbonate, threaded to engage threaded boiler flanges welded into the wall 116, there being a vacuum-tight seal between each sight-glass 124 and the corresponding boiler flange. Usually, three such sight glasses are disposed in a vertical alignment to allow viewing of a wide range of waste levels.

Also, the holding tank 110 has attachment points such as hooks or handles 178 for lifting-equipment required when moving the holding tank 110 on or off the vehicle 180.

The holding tank 110 is typically 10', 11' or 12' long and about 7.5' wide. There are normally three support assemblies, spaced 22.5" apart between centers. The reinforcing strips 132 and the support strips 136 are mild steel strips 3" wide and 0.25" thick. The support pillars 134 are made from tubular mild steel having an outside diameter of 1.5" and a wall thickness of 0.25". Within each support assembly 130, the support pillars 134 are spaced at 16" intervals. Of the indents 122, one has an indented area of 28"×10" while the other has an area of 28"×6". Relative to the headboard 160, the front deck 118 extends about 2.75' forward while the rear deck 120 extends about 7.75' rearward. The drainage channel 140 is 6" wide and extends 8" below the floor 112 at its lower end. The depth of the holding tank 110 is usually 1'. Some holding tanks may be as long as 16' and have a 1' or an 8" depth.

Given the above measurements of the holding tank 110, various values of the aspect ratio can be calculated. For example, with the 11'-long holding tank 110 one may divide the depth (1') into the width at the indents (6'), into the more general width of 7.5', or into the length of 11'. The holding tank 110 therefore has aspect ratios of 6, 7.5 and 11. Even the least of these values represents a significant departure from the "ideal" aspect ratio of 1. A holding tank 110 that is 16' long and 8" deep has aspect ratios as high as 24.

To summarize, the holding tank 110 is configured to be evacuated to a partial vacuum and to withstand that vacuum. The required pressure differential (about 12" of mercury) would most likely bring about the collapse of the holding tank 110 with the aforementioned aspect ratios, were it not for the internal support assemblies 130. However, as the holding tank 110 is evacuated, the support assemblies 130 increasingly absorb the pressure differential.

The pumping system 148 includes primary and secondary vacuum traps which preclude the entry of fluids from the holding tank 110 into the pump, and also isolate the pump from the holding tank 110 once the latter has been filled to some preselected level.

Figure 7:
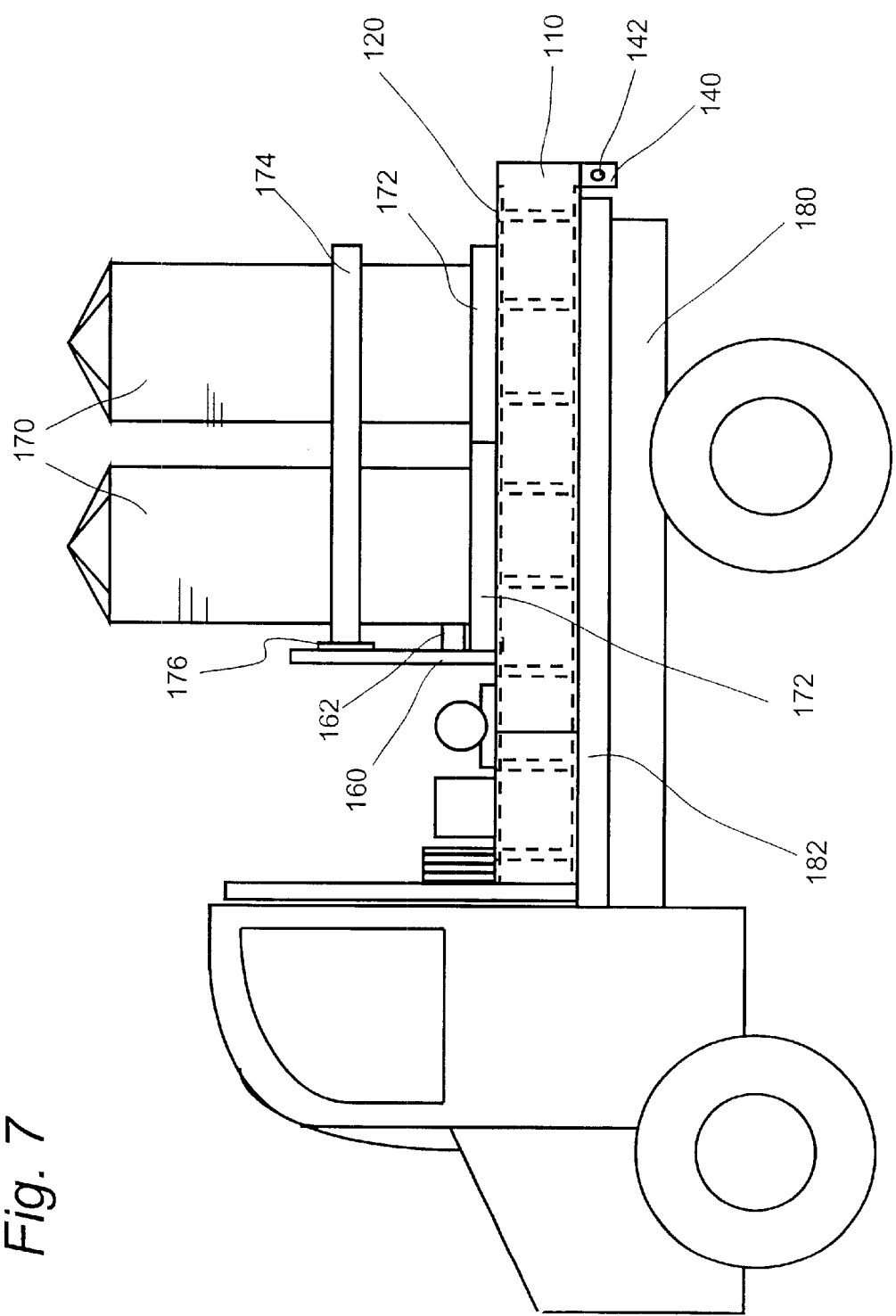
FIG. 7 is a side view of the transportable sewage system aboard a vehicle.
Figure 8:
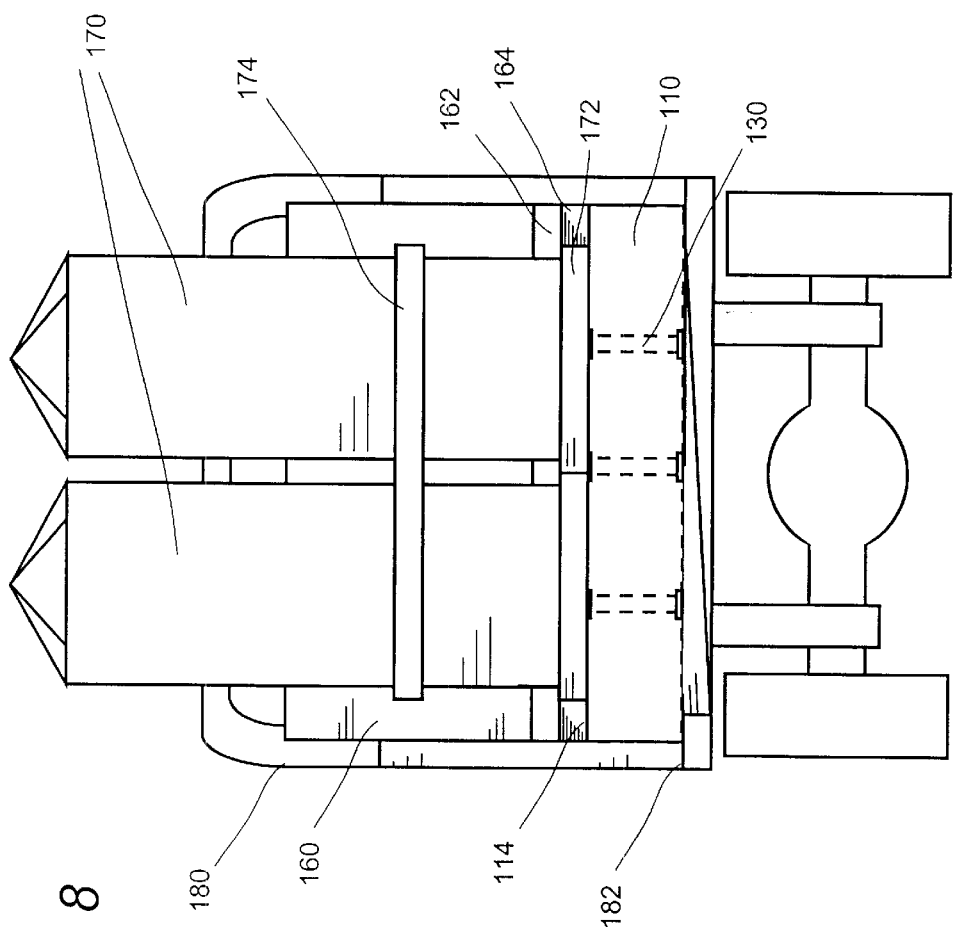
FIG. 8 is a rear view of the transportable sewage system aboard the vehicle.

The low profile transportable sewage system 100 may be used as follows for transporting portable toilets 170. It is assumed that the system 100 is installed on the vehicle 180 as shown in FIGS. 7 and 8 with enough rear overhang of the holding tank 110 for the drainage channel 140 to clear the truckbed 182. The vehicle 180 is moved into proximity with the portable toilet 170 which can then be loaded atop the deck 114. Any convenient method of loading can be used, although it is conventional in transporting portable toilets to use a vehicle lift-gate (not shown). Once the portable toilet 170 is at deck level, it is slid forward along the diamond-plate deck 114 until the skid base 172 is fully received into the gap 164, the portable toilet 170 then abutting the headboard 160. If a second toilet 170 needs to be transported on the same trip, it is loaded in the same way and moved until it abuts the headboard 160 adjacent the first toilet 170, again with the skid base 172 received into the gap 164. Although the exact dimensions of "standard" portable toilets may vary, they are generally sized to have a "footprint" approximating to a square with a side in the range 3' to 3.5'. In practice, this means two, but no more than two, portable toilets 170 may be accommodated within the width of a typical vehicle. It follows, therefore, that the same limitation applies to the holding tank 110 of this invention. Additional toilets (to a typical total load of four, or six if the holding tank is 16' long) can be loaded and slid along the deck 114 into positions behind the first and second toilets 170; of course, these additional toilets do not abut the headboard 160. When the required toilets 170 are in position, at least one strap 174 is passed around all of them and secured with a suitable fastening means such as a strap 174 and in particular a ratchet strap. The foregoing procedure is reversed for unloading the toilets.

Regarding the actual filling and draining of the low profile holding tank 110, this is equivalent to filling and draining conventional holding tanks. Given that the holding tank 110 and pumping system 148 are present and functional on the vehicle, the procedure may be summarized as follows: actuating the pumping system 148 to evacuate the holding tank 110 so that the support assembly 130 increasingly absorbs pressure from the deck 114; using the vacuum hose 152, fluidly connecting the holding tank 110 and the portable toilet 170 such that waste from the portable toilet 170 is transferred to the holding tank 110; disconnecting the holding tank 110 and the portable toilet 170 after the waste has been transferred and uncoupling the vacuum hose 152; shutting off the pumping system 148; transporting the holding tank 110 to a treatment plant; and draining the holding tank 110 through the discharge port 142.

Depending on the particular treatment plant, the discharge port 142 may be positioned directly above a receiving area and the holding tank 110 drained by gravity, without any physical connection, or the holding tank 110 may be drained through a hose connecting the discharge port 142 with the treatment plant.

While the toilets 170 are being transported, slipstream wind exerts a pressure on forward-facing portions of the first and second toilets 170, tending to tilt them rearward. Any such tilting urges the skid base 172 upward against the retaining member 162, which limits further tilting. In fact, increasing wind pressure increases pressure between the skid base 172 and the retaining member 162, improving the frictional contact between them and precluding unwanted movement.

The high aspect ratio of the low profile holding tank 110 allows it to be configured to occupy generally the entire cargo space of the truck bed 182. The deck 114 being flat, this in effect provides a raised but undiminished cargo-carrying area for the vehicle 180. Some of this surface is used for equipment such as pumping machinery necessary for the holding tank 110 to function, but such equipment is equally necessary for conventional holding tanks and cannot be accommodated thereon. Overall, the low profile holding tank 110 allows a user to make much better use of cargo space than is possible with conventional holding tanks.

While the invention has been described with reference to a preferred embodiment, it will be understood by those skilled in the art that various changes may be made and equivalents may be substituted for elements thereof without departing from the scope of the invention. Therefore, it is intended that the invention not be limited to the particular embodiment disclosed as the best mode contemplated for carrying out this invention, but that the invention will include all embodiments falling within the scope and spirit of the appended claims.

What is claimed:

1. A low profile transportable sewage system, comprising:
   (a) a holding tank having a deck, a floor, and a wall between the deck and the floor;
   (b) at least one reinforcing member attached to the floor;
   (c) a plurality of support pillars attached to the reinforcing member and extending upwardly therefrom;

(d) a deck-support member corresponding to each reinforcing member, the deck support member being attached to the support pillars; and (e) a drainage channel within the holding tank with a higher end and a lower end, the higher end being generally level with the floor;

the holding tank having an aspect ratio of at least 6 and capable of being evacuated to withstand a pressure differential of at least 12" of mercury.

2. The low profile transportable sewage system of claim 1, the holding tank having an inlet port, a discharge port and a vacuum port.

3. The low profile transportable sewage system of claim 2, the inlet port and the vacuum port being in the deck and the discharge port being at the lower end of the drainage channel.

4. The low profile transportable sewage system of claim 1, comprising also a transverse headboard extending upwardly from the deck and defining a front and a rear portion thereof.

5. The low profile transportable sewage system of claim 4, wherein the rear portion has an area at least twice that of the front portion.

6. The low profile transportable sewage system of claim 4, wherein the headboard has a rearward facing retaining member.

7. The low profile transportable sewage system of claim 6, wherein there is a gap between the retaining member and the deck.

8. The low profile transportable sewage system of claim 1, having also a pumping system connected to the holding tank.

9. A low profile holding tank, comprising:

(a) a deck, a floor, and a wall between the deck and the floor;

(b) at least one internal support assembly extending between the floor and the deck; and (c) a drainage channel with a higher end and a lower end, the higher end being generally level with the floor;

the holding tank having an aspect ratio of at least 6 and capable of being evacuated to withstand a pressure differential of at least 12" of mercury.

10. The low profile transportable sewage system of claim 9, the deck having an area capable of carrying a plurality of standard portable toilets.

11. The low profile transportable sewage system of claim 9, the deck having an area capable of carrying at least four standard portable toilets.

12. The low profile transportable sewage system of claim 9, the deck having an area capable of carrying six standard portable toilets.

13. The low profile holding tank of claim 9, having an aspect ratio of at least 12.

14. The low profile holding tank of claim 9, having an aspect ratio of 24.

15. The low profile holding tank of claim 9, wherein the support assembly increasingly absorbs pressure from the deck as the holding tank is evacuated.

16. The low profile holding tank of claim 9, wherein the material of the holding tank is mild steel.

17. The low profile holding tank of claim 9, wherein the material of the deck is diamond plate steel.

18. The low profile holding tank of claim 9, comprising also at least one fluid-level indicator in the wall.

19. The low profile holding tank of claim 18, wherein the fluid-level indicator is a fish-eye sight-glass.

20. A method of handling waste from portable toilets, comprising:

(a) constructing a holding tank having a deck, a floor, and a wall between the deck and the floor; at least one internal support assembly extending between the floor and the deck; and a drainage channel with a higher end and a lower end, the higher end being generally level with the floor and the lower end having a discharge port; the holding tank having an aspect ratio of at least 6;

(b) installing the holding tank on a vehicle to substantially occupy a cargo space thereof;

(c) connecting a pumping system to the holding tank;

(d) actuating the pumping system to evacuate the holding tank so that the support assembly increasingly absorbs pressure from the deck;

(e) fluidly connecting the holding tank and a portable toilet such that waste from the portable toilet is transferred to the holding tank;

(f) disconnecting the holding tank and the portable toilet after the waste has been transferred;

(g) shutting off the pumping system;

(h) transporting the holding tank to a selected destination; and (i) discharging the waste in the holding tank through the discharge port.

21. The method of claim 20, including securing atop the deck a transverse headboard extending upwardly therefrom.

22. The method of claim 21, including securing to the headboard a transverse retaining member with a gap between the retaining member and the deck.

23. The method of claim 22, including loading atop the deck at least one standard portable toilet.

24. The method of claim 23, including interlocking the retaining member with a portion of the portable toilet.

25. The method of claim 23, including loading atop the deck at least four portable toilets.

26. The method of claim 25, including loading atop the deck six portable toilets.

* * * * *